(12) United States Patent
Sugimoto et al.

(10) Patent No.: US 7,922,190 B2
(45) Date of Patent: Apr. 12, 2011

(54) AIRBAG AND AIRBAG DEVICE

(75) Inventors: Shinichi Sugimoto, Tokyo (JP); Takeshi Sone, Tokyo (JP)

(73) Assignee: Takata Corporation, Tokyo (JP)

( * ) Notice: Subject to any disclaimer, the term of this patent is extended or adjusted under 35 U.S.C. 154(b) by 272 days.

(21) Appl. No.: 12/161,159

(22) PCT Filed: Oct. 16, 2006

(86) PCT No.: PCT/JP2006/320594
§ 371 (c)(1),
(2), (4) Date: Jul. 16, 2008

(87) PCT Pub. No.: WO2007/083422
PCT Pub. Date: Jul. 26, 2007

(65) Prior Publication Data
US 2010/0164210 A1    Jul. 1, 2010

(30) Foreign Application Priority Data
Jan. 18, 2006   (JP) ................................ 2006-009572

(51) Int. Cl.
B60R 21/233    (2006.01)
(52) U.S. Cl. ...... 280/729; 280/736; 280/742; 280/743.1
(58) Field of Classification Search .................. 280/729, 280/736, 742, 743.1
See application file for complete search history.

(56) References Cited

U.S. PATENT DOCUMENTS

| | | | | |
|---|---|---|---|---|
| 5,496,061 A | * | 3/1996 | Brown | 280/730.2 |
| 5,586,782 A | * | 12/1996 | Zimmerman et al. | 280/730.2 |
| 5,782,529 A | | 7/1998 | Miller, III et al. | |
| 5,895,070 A | * | 4/1999 | Lachat | 280/730.2 |
| 6,152,481 A | * | 11/2000 | Webber et al. | 280/730.2 |
| 6,527,296 B2 | * | 3/2003 | Bakhsh et al. | 280/730.2 |
| 6,543,804 B2 | * | 4/2003 | Fischer | 280/730.2 |
| 6,648,368 B2 | * | 11/2003 | Smith et al. | 280/730.2 |
| 6,695,341 B2 | * | 2/2004 | Winarto et al. | 280/730.2 |
| 6,848,708 B2 | * | 2/2005 | Green et al. | 280/729 |

(Continued)

FOREIGN PATENT DOCUMENTS
DE    196 15 096 A1    9/1996
(Continued)

OTHER PUBLICATIONS

English translation of the International Preliminary Report on Patentability (Chapter I of the Patent Cooperation Treaty) from the International Bureau for International Application No. PCT/JP2006/320594 dated Jul. 31, 2008, 5 pages.

*Primary Examiner* — Paul N. Dickson
*Assistant Examiner* — Barry Gooden, Jr.
(74) *Attorney, Agent, or Firm* — Fitch, Even, Tabin & Flannery

(57) ABSTRACT

In one form, an airbag is provided with a first bag as a bag formed by joining base fabrics which includes a gas inlet for supplying pressure fluid fed from an inflator inward and a discharge passage for discharging the pressure fluid supplied inward to an outside, a second bag as a bag formed by joining base fabrics which includes an intake passage for introducing the pressure fluid discharged from the discharge passage of the first bag inward, and a passage joint member for joining the discharge passage of the first bag and the intake passage of the second bag while maintaining each cross section shape of the passages.

6 Claims, 8 Drawing Sheets

U.S. PATENT DOCUMENTS

| | | | |
|---|---|---|---|
| 6,883,826 B2* | 4/2005 | Fujiwara | 280/730.2 |
| 6,890,000 B2* | 5/2005 | Taubenberger et al. | 280/733 |
| 7,000,947 B2* | 2/2006 | Kumagai et al. | 280/743.1 |
| 7,066,487 B2* | 6/2006 | Sullivan et al. | 280/729 |
| 7,264,269 B2* | 9/2007 | Gu et al. | 280/730.2 |
| 7,316,415 B2* | 1/2008 | Jamison | 280/729 |
| 7,407,182 B2* | 8/2008 | Aoki et al. | 280/730.2 |
| 7,549,669 B2* | 6/2009 | Keshavaraj | 280/729 |
| 7,607,682 B2* | 10/2009 | Kurimoto et al. | 280/729 |
| 2003/0006596 A1* | 1/2003 | Schneider et al. | 280/743.1 |
| 2003/0034637 A1* | 2/2003 | Wang et al. | 280/729 |
| 2003/0234523 A1* | 12/2003 | Henderson et al. | 280/730.2 |
| 2004/0130127 A1* | 7/2004 | Kurimoto et al. | 280/729 |
| 2005/0173900 A1* | 8/2005 | Zhao et al. | 280/730.2 |
| 2005/0189743 A1* | 9/2005 | Bakhsh et al. | 280/730.2 |
| 2005/0248132 A1* | 11/2005 | Wheelwright | 280/729 |
| 2006/0001244 A1* | 1/2006 | Taguchi et al. | 280/729 |
| 2006/0022439 A1* | 2/2006 | Bayley et al. | 280/729 |
| 2006/0033318 A1* | 2/2006 | Ryan et al. | 280/743.1 |
| 2006/0043702 A1* | 3/2006 | Jamison | 280/729 |
| 2006/0071458 A1* | 4/2006 | Sendelbach et al. | 280/729 |
| 2006/0108777 A1* | 5/2006 | Mabuchi et al. | 280/730.2 |
| 2006/0108780 A1* | 5/2006 | Hotta et al. | 280/732 |
| 2006/0131845 A1* | 6/2006 | Belwafa et al. | 280/729 |
| 2006/0163849 A1* | 7/2006 | Keshavaraj | 280/730.2 |
| 2006/0186655 A1* | 8/2006 | Ehrke | 280/743.1 |
| 2006/0197318 A1* | 9/2006 | Choi et al. | 280/729 |
| 2007/0057491 A1* | 3/2007 | Bayley | 280/730.2 |
| 2007/0102904 A1* | 5/2007 | Bowers | 280/729 |
| 2007/0200327 A1* | 8/2007 | Kloss et al. | 280/740 |
| 2007/0267851 A1* | 11/2007 | Svenbrant et al. | 280/729 |
| 2008/0023945 A1* | 1/2008 | Zauritz et al. | 280/729 |
| 2008/0042414 A1* | 2/2008 | Nagaoka | 280/743.1 |
| 2008/0079247 A1* | 4/2008 | Henricsson et al. | 280/730.2 |
| 2009/0236838 A1* | 9/2009 | Leo et al. | 280/743.1 |

FOREIGN PATENT DOCUMENTS

| | | |
|---|---|---|
| DE | 196 14 314 A1 | 10/1996 |
| JP | 09-220993 A | 8/1997 |
| JP | 11-198699 A | 7/1999 |
| JP | 2000-335355 A | 12/2000 |
| JP | 2002-037011 A | 2/2002 |
| JP | 2003-182499 A | 7/2003 |
| JP | 2006-008105 A | 1/2006 |

* cited by examiner

AIRBAG AND AIRBAG DEVICE

CROSS-REFERENCE TO RELATED APPLICATION

This application is a U.S. national phase application filed under 35 U.S.C. §371 of International Application PCT/JP2006/320594, filed on Oct. 16, 2006, designating the United States, which claims priority from JP 2006-009572, filed Jan. 18, 2006, which are hereby incorporated herein by reference in their entirety.

TECHNICAL FIELD

The present invention relates to an airbag and an airbag device installed in a vehicle such as an automobile.

BACKGROUND ART

Various types of airbag devices have been employed for restraining an occupant's body upon collision of the automobile, for example, a driver-side airbag device which inflates and deploys the airbag from the rotating center of the steering wheel toward the driver in the driver's seat, or a passenger airbag which inflates and deploys from the instrument panel towards the passenger seat.

When the serious accident which exerts the large external force to the automobile occurs resulting from the overturn of the vehicle or the falling of the heavy load, for example, the fallen tree, the resultant impact may be exerted to the head of the occupant from above. The airbag which copes with the aforementioned situation has been proposed ( Japanese Unexamined Patent Application Publication No. 2002-37011).

The generally employed art as disclosed above has a basic structure where the airbag formed by sewing the base fabrics into a bag is stored inside a seat back (or a head rest) of the vehicle seat, and in case of emergency, the pressure fluid from the inflator is supplied to the airbag so as to be inflated and deployed upward of the occupant's head.

In the aforementioned basic structure having the airbag formed of plural bags, the joint portion for distributing the pressure fluid among those bags is required to smoothly distribute the pressure fluid between the bags upon inflation and deployment.

SUMMARY OF THE INVENTION

It is an object of the present invention to provide a technology effective for improving the deployment performance by smoothly distributing the pressure fluid among the plural bags upon inflation and deployment.

A first invention of the present invention provides an airbag having a first bag formed as a bag by joining base fabrics, which includes a supply passage for supplying a pressure fluid fed from an inflator inward, and a discharge passage for discharging the pressure fluid supplied inward to an outside, and a second bag formed as a bag by joining base fabrics, which includes an intake passage for introducing the pressure fluid discharged from the discharge passage of the first bag inward. A joint portion between the discharge passage of the first bag and the intake passage of the second bag is positioned so as not to interfere with each inflation and deployment of the first bag and the second bag.

When the airbag inflates and deploys upon supply of the pressure fluid from the inflator, the joint portion between the discharge passage and the intake passage for communicating insides of two chambers of the first bag and the second bag serves to suppress reduction in the cross section of the passage which is unlikely to be pressed by the inflating bag. This makes it possible to allow the pressure fluid to smoothly flow from the first bag to the second bag, thus improving the deployment performance of the entire airbag.

The second invention provides an airbag having a first bag formed as a bag by joining base fabrics, which includes a supply passage for supplying a pressure fluid fed from an inflator inward, and a discharge passage for discharging the pressure fluid supplied inward to an outside, and a second bag formed as a bag by joining the base fabrics, which includes an intake passage for introducing the pressure fluid discharged from the discharge passage of the first bag inward. The discharge passage of the first bag and the intake passage of the second bag are joined while maintaining each cross section shape of the discharge passage and the intake passage.

When the airbag inflates and deploys upon supply of the pressure fluid from the inflator, the joint portion between the discharge passage and the intake passage for communicating insides of two chambers of the first bag and the second bag is capable of maintaining the cross section of the passage, while being protected from the pressure resulting from the inflation of the bag by the passage joint member. This allows the pressure fluid to smoothly flow from the first bag to the second bag, thus improving the deployment performance of the entire airbag. If the joint portion is formed through sewing, the pressure loss of the pressure fluid may occur from the sewn portion. However, the passage joint member serves to suppress such pressure loss, thus further improving the deployment performance of the entire airbag.

In the third invention according to the second invention, the passage joint member includes a hollow communication pipe inserted into the discharge passage and the intake passage, and an outer tightening member for tightening the discharge passage and the intake passage from an outer circumference to be secured to the hollow communication pipe.

The airbag in the folded state does not crush the discharge passage and the intake passage each as the tubular passage, and the cross section of each passage at the inner periphery may be maintained by the hollow joint pipe. The use of the outer tightening member is capable of performing tightening with high sealing capability.

In the fourth invention according to the third invention, the discharge passage is joined at a position to be inserted between an outer circumference of the hollow communication tion pipe and an inner circumference of the intake passage.

An end portion of the discharge passage is stored inside the intake passage. When the pressure fluid is discharged from the discharge passage at high pressure, leakage of the pressure fluid directly from the discharge passage to outside may be suppressed.

In the fifth invention according to any one of the first to the fourth invention, the first bag includes a pressure deployment portion which inflates and deploys by the pressure fluid fed from the inflator, and the pressure deployment portion includes a deployment discharge portion for discharging the second bag upward of a head of the occupant. The second bag includes an upper deployment portion which is inflated and deployed upward of a head of the occupant by the pressure fluid fed from the inflator.

When the pressure fluid from the inflator is supplied to the airbag, the pressure deployment portion of the first bag inflates to accelerate the deployment of the second bag with the deployment guide portion during the inflation. Then the upper deployment portion of the second bag inflates to deploy upward of the occupant's head such that the upward movement of the occupant's head is restrained.

In the sixth invention according to the fifth invention, the pressure deployment portion of the first bag inflates and deploys at a side opposite a back of the head of the occupant. The second bag includes a lower deployment portion which is positioned to inflate and deploy at a side opposite the occupant so as to be overlapped with the pressure deployment portion.

The total thickness including those two of the pressure deployment portion and the lower deployment portion is allowed to change the position of the occupant so as to effectively bend the back of the occupant's head forward. The pressure fluid is directly supplied from the inflator to the first bag to start inflation and deployment first. Subsequently, the pressure fluid is introduced into the second bag such that the upper deployment portion starts inflating and deploying above the occupant's head. As a result, no forced bending or folding is generated in the upper deployment portion, thus allowing the entire airbag to smoothly inflate and deploy.

In the seventh invention according to the sixth invention, a sewn joint portion formed in the pressure deployment portion and a sewn joint portion formed in the lower deployment portion are formed not to be aligned with each other.

Upon inflation and deployment of the pressure deployment portion and the lower deployment portion, the thin portion on the sewn joint portion and the thick portion between the sewn joint portions in the thickness direction are displaced between the pressure deployment portion and the lower deployment portion. When the back of the occupant's head is pressed by the portion having the pressure deployment portion overlapped with the lower deployment portion, the respective thin portions, or thick portions are not overlapped, that is, the abutment point between the pressure deployment portion and the lower deployment portion is kept constant. The positional relationship between those two points in a mesh state is stabilized without causing displacement.

In the eighth invention according to any one of the fifth to the seventh invention, the discharge passage of the first bag is positioned apart from a line extending in an inflow direction of the pressure fluid from the supply passage.

In the above structure, the pressure fluid is not allowed to directly flow from the supply passage to the discharge passage inside the first bag, but to slowly bypass the passage. This makes it possible to have the time lag in the inflation and deployment between the first bag and the second bag. The order for inflating and deploying the two chambers may be definitely determined to allow smooth inflation and deployment of the entire airbag.

The ninth invention includes the airbag according to any one of the first to the eighth invention, and an inflator for supplying the pressure fluid for inflating and deploying the airbag.

According to the invention, the pressure fluid is smoothly distributed among plural bags upon inflation and deployment of the airbag so as to improve the deployment performance.

DETAILED DESCRIPTION OF THE PREFERRED EMBODIMENTS

Figure 1:
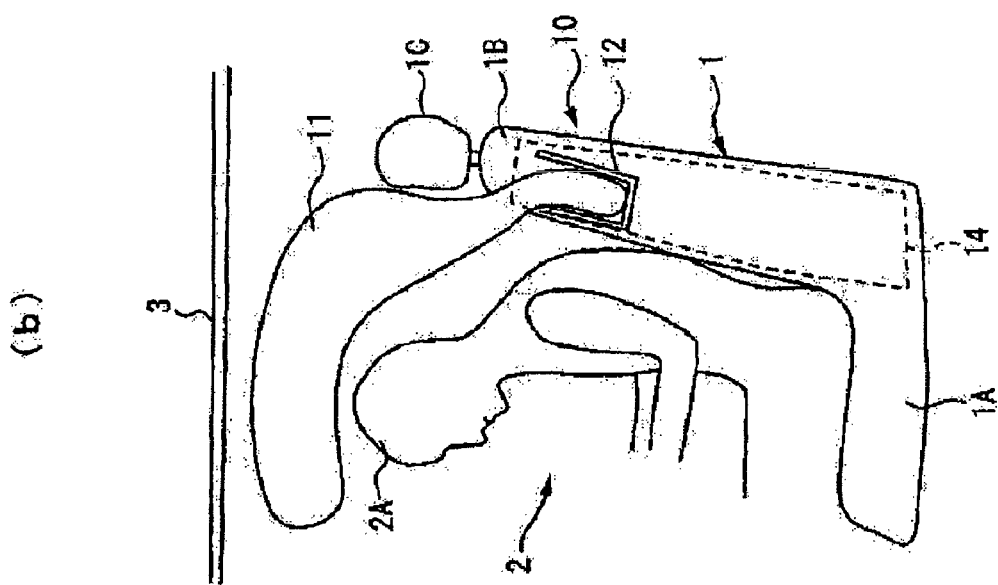
FIG. 1 is a sectional view schematically showing an automobile seat equipped with an airbag device according to an embodiment of the present invention.
Figure 1:
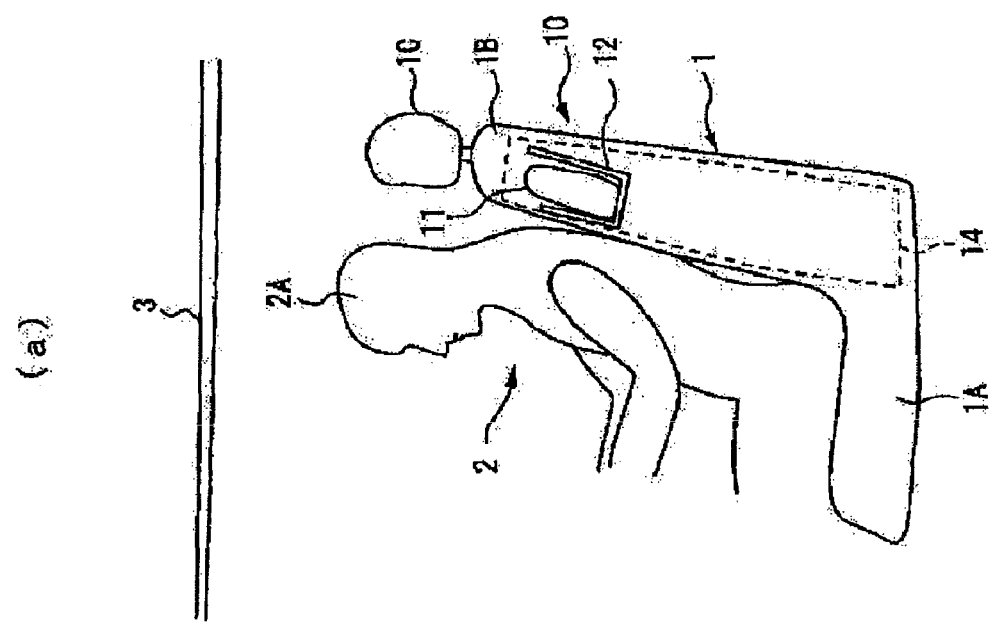

An embodiment of the present invention will be described referring to the drawings.

FIG. 1 schematically shows a side view of a seat 1 of an automobile equipped with an airbag according to an embodiment of the present invention. FIG. 1(a) represents a normal state, and FIG. 1(b) represents a state where the airbag inflates. Referring to FIG. 1, an occupant 2 is seated on the seat 1. The seat 1 includes a seat section 1A from where a seat back 1B extends upward. A head rest 1C is attached to a top portion of the seat back 1B.

The seat 1 includes an airbag device 10 inside the seat back 1B for restraining a head 2A of the occupant 2 upon overturning of the automobile caused by the accident. The airbag device 10 includes a first bag 35 (see FIG. 5) formed by sewing a first base fabric 35A and a second base fabric 35B together, a second bag 36 (see FIG. 6) formed by sewing a third base fabric 36B and a fourth base fabric 36B together, and a passage joint member 60 (see FIGS. 4, 7 and 8) for joining the first bag 35 and the second bag 36. The airbag device 10 is provided with an airbag 11 structured to deploy upward of the head 2A of the occupant 2 upon inflation, a retainer 12 which stores the airbag 11 in the folded state, and an inflator 13 (see FIGS. 2 and 3) which supplies gas (pressure fluid) for inflating and deploying the airbag 11. The seat 1 includes a seat frame 14 as a frame of the seat 1, which is formed of side plates 14A (see FIG. 2) and a cross member 14B (see FIG. 2). The retainer 12 and the inflator 13 are attached to the seat frame 14 (to be described later).

The automobile in which the airbag device 10 is installed is equipped with various sensors (not shown) for detecting or predicting the incidence of collision (including side collision) or overturn of the automobile. An inflator control circuit (not shown) is structured to activate an initiator (not shown) of the inflator 13 based on detection signals from those sensors.

Referring to FIG. 1(a), in the normal state, the airbag 11 is stored in the retainer 12 in the folded state. Meanwhile, when the automobile encounters the accident to be collided or overturned, the aforementioned sensor detects the incidence such that the activation signal is input from the inflator control circuit to the initiator of the inflator 13. Then the initiator is activated to allow the airbag 11 to inflate and deploy between a roof 3 of the automobile and the head 2A of the occupant2 (if the automobile has no roof 3, that is, of convertible type, the airbag 11 is structured to deploy upward of the head 2A). Then the pressure portion of the first bag 35 (see FIGS. 4 and 5) and the lower portion of the second bag 36 (see FIGS. 4 and 6) inflate and deploy to push the head 2A of the occupant 2 forward. The head 2A of the occupant 2 is then bent forward to reduce strain on the neck.

Figure 2:
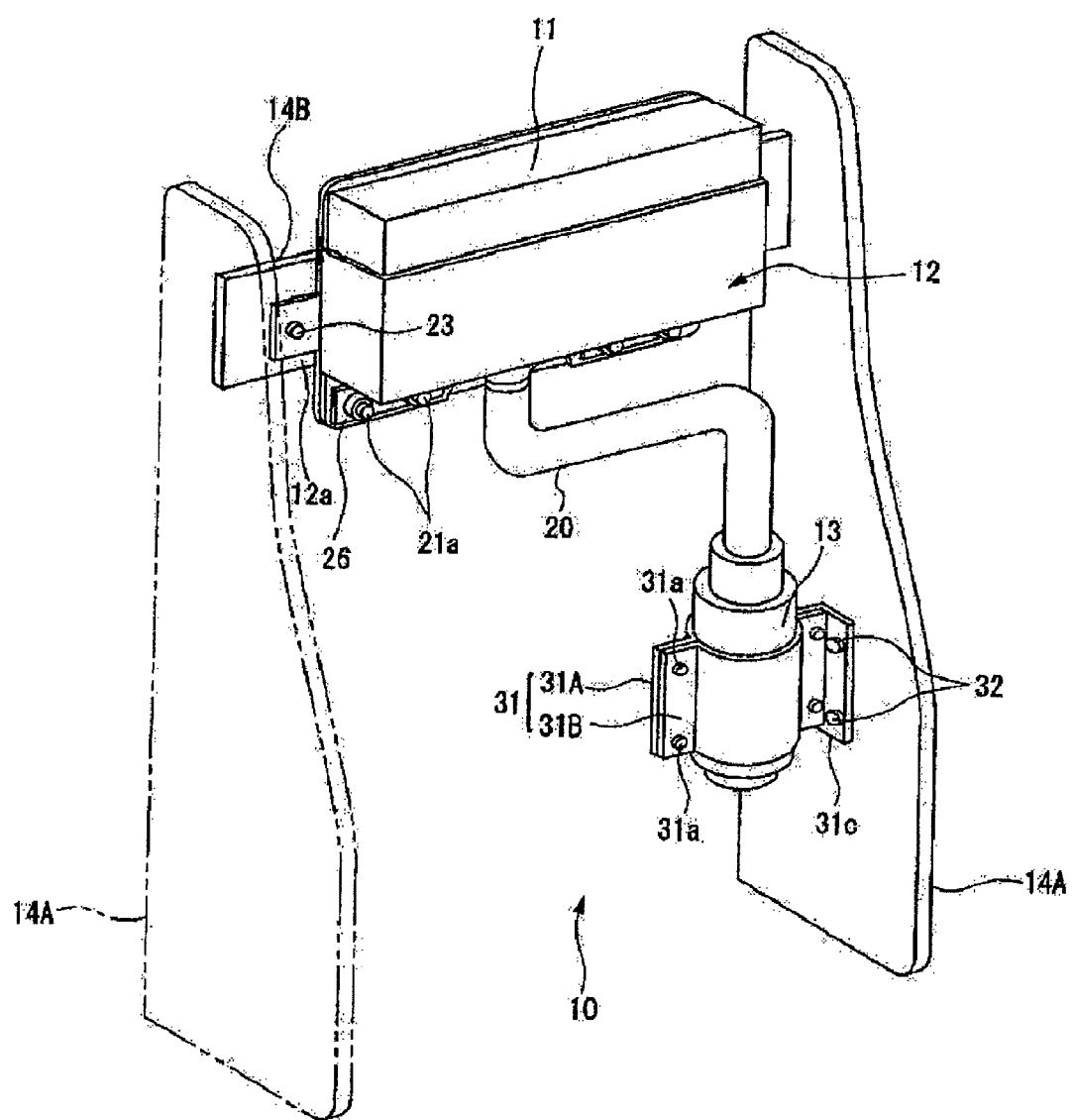
FIG. 2 is a perspective view of a fixing structure of the airbag device according to the embodiment of the present invention to a seat frame.
Figure 3:
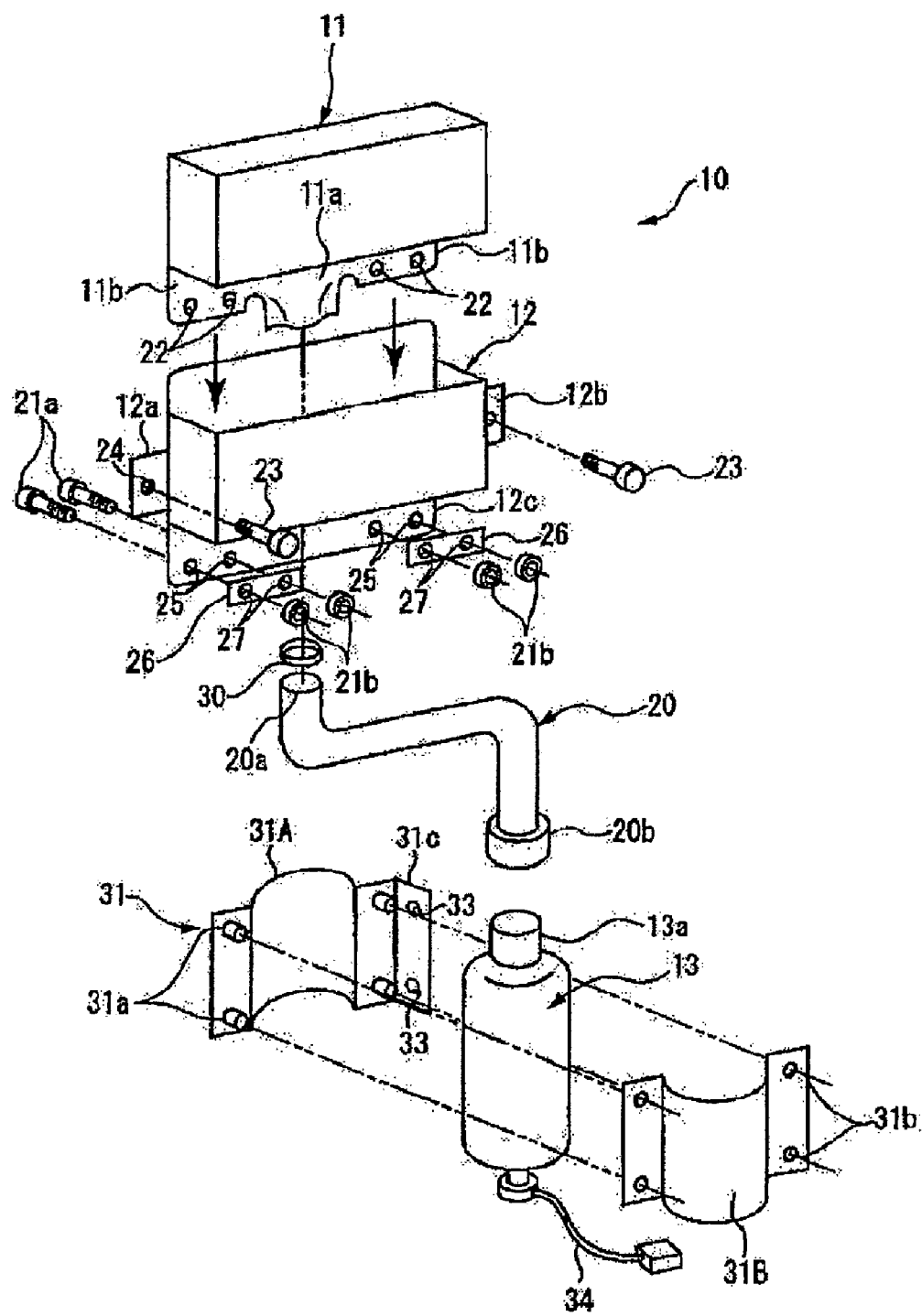
FIG. 3 is an exploded perspective view of the airbag device, representing the fixing structure shown in FIG. 2 in further detail.

FIG. 2 is a perspective view showing a structure for fixing the airbag device 10 to the seat frame 14. FIG. 3 is an exploded perspective view of the airbag device 10 representing the fixing structure in detail.

Referring to FIGS. 2 and 3, the seat frame 14 includes a pair of side plates 14A, 14A laterally arranged at both sides (both sides in the left-to-right direction) inside the seat back 1B of the seat 1, and a cross member 14B which laterally extends between the side plates 14A, 14A to be linked. The side plates 14A, 14A and the cross member 14B are disposed inside the seat back 1B of the seat 1. The seat frame 14 includes a base plate (not shown) disposed inside the seat section 1A.

A gas inlet (supply passage) 35a connected to the inflator 13 via a pipe member 20, and fixture pieces 35b, 35c disposed at both sides of the gas inlet 35a are formed at a proximal end of the airbag 11 (at the inflator side, see lower side of FIG. 3). Two bolt holes 22 through which a fixture bolt 21a for fixing the airbag 11 and the retainer 12 is inserted are formed in the fixture pieces 35b, 35c, respectively. Meanwhile, the retainer 12 includes attachment portions 12a, 12b each having a bolt hole 24 through which a bolt 23 for fixing the retainer 12 is inserted at both sides in the width direction. An attachment portion 12c having a bolt hole 25 at the position corresponding to the bolt hole 22 of an airbag attachment portion 11b is formed at the lower portion (inflator side, the lower side of FIG. 3) of the retainer 12.

Plural bolts 21a (four bolts in the embodiment) are inserted into a bolt hole 25 formed in the retainer attachment portion 12c, the bolt holes 22 of the airbag attachment portion 11b, and bolt holes 27 each formed at the position corresponding to the bolt hole 22 of the airbag installation portion 11b so as to be tightened with nuts 21b when the airbag 11 is stored in the retainer 12 in the folded state. As a result, the airbag 11 is fixed to the retainer 12 in the folded state. The plural bolts 23 (two in the embodiment) are inserted into the bolt holes 24 of the retainer attachment portions 12a, 12b, and then tightened into tightening holes (not shown) formed in the cross member 14B. This makes it possible to fix the retainer 12 which stores the folded airbag 11 to the cross member 14B.

The pipe member 20 is a metal pipe having plural bent positions (two positions in the embodiment), and disposed below the retainer 12. The pipe member 20 is joined with the airbag 11 by covering a bag side end portion 20a of the pipe member 20 with the gas inlet 35a of the airbag 11 so as to be calked and fixed using a metal clamp band 30, for example. The pipe member 20 is joined with the inflator 13 by covering an upper end portion 13a of the inflator 13 with a connector 20b at an end of the pipe member 20 at the inflow side so as to be adhered (or welded). In this way, the airbag 11 and the inflator 13 are connected via the pipe member 20.

The inflator 13 is disposed further below the pipe member 20, and attached to the side plate 14A at one side (right side in the lateral direction in the embodiment) with a fixture member 31. The fixture member 31 includes a pair of fixture plates 31A, 31B for interposing the inflator 13 to be supported. The fixture plates 31A, 31B interpose and fix the inflator 13 by inserting plural rivets 31a (four in the embodiment) formed on the fixture plate 31A into plural rivet holes 31b (four in the embodiment) formed in the fixture plate 31B at the corresponding positions to be riveted. One side (right side in the width direction) of the fixture plate 31A is bent at approximately 90° to form a fixture portion 31c having bolt holes 33 through which plural bolts (two in the embodiment) are inserted, and tightened into not shown tightening holes formed in the side plate 14A. As a result, the inflator 13 is fixed to the side plate 14A via the fixture member 31.

The inflator 13 is connected to a control unit (not shown) as described above with a cable 34 through which an ignition control of the inflator 13 is executed.

Figure 4:
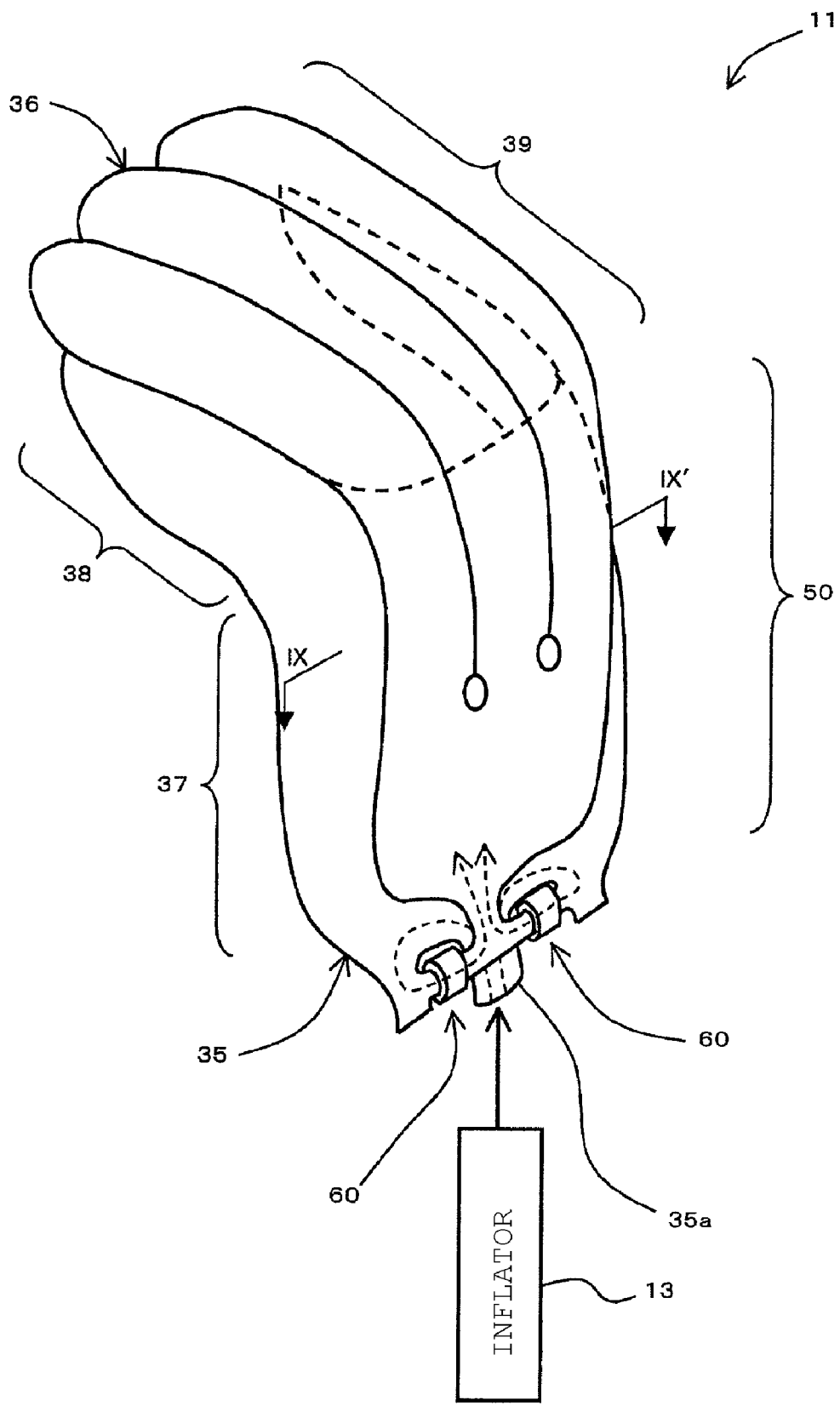
FIG. 4 is a perspective view of an entire structure of the airbag which has been inflated and deployed.

FIG. 4 is a perspective view showing an entire structure of the airbag 11 in the fully inflated and deployed state.

Referring to FIG. 4, the airbag 11 has a first bag 35 which contains a pressure deployment portion 37 and support deployment portions 38 for inflating and deploying the pressure deployment portion 37 at the side opposite the back of the occupant's head upon supply of the pressure fluid from the inflator 13 firstly, a second bag 36 which contains an upper deployment portion 39 and a lower deployment portion 50 for inflating and deploying the upper deployment portion 39 upward of the occupant's head, and inflating and deploying the lower deployment portion 50 at the position overlapped with the pressure deployment portion 37 opposite the occupant upon supply of the pressure fluid via the first bag 35, and a passage joint member 60 for joining insides of the first bag 35 and the second bag 36 so as to be communicated with each other. Two discharge passages 35t formed as the tubular passages in the first bag 35, and two intake passages 36i formed as the tubular passages in the second bag 36 are joined with high sealing capability.

The gas inlet 35a is formed at the lower portion of the first bag 35. Gas injected from the inflator 13 is supplied to the pressure deployment portion 37 and the support deployment portion 38 within the first bag 35 via the pipe member 20 and the gas inlet 35a. The pressure fluid flows from two discharge passages 35t at both sides of the gas inlet 35a at the lower portion of the first bag 35 to two intake passages 36i at both sides of the second bag 36 in the lower portion, thus supplying the fluid into the upper deployment section 39 and the lower deployment section 50.

Each of the aforementioned first bag 35 and the second bag 36 forms the airbag 11 by connecting the respective flow passages of two independent bags each formed by sewing the base fabric at the side of the occupant 2 (front side of the automobile) and the base fabric opposite the occupant 2 (rear side of the automobile).

Figure 5:
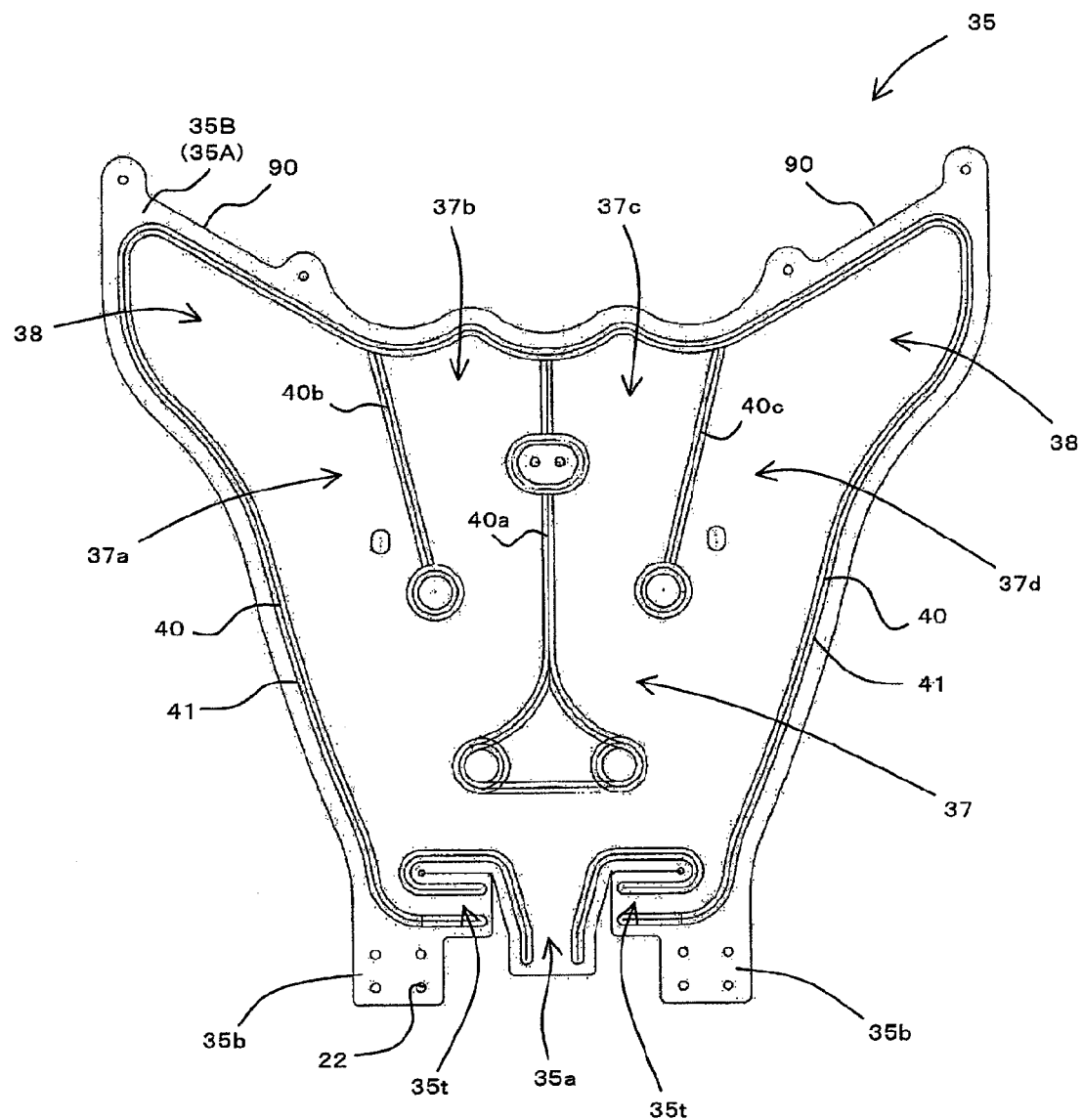
FIG. 5 is a plan view showing an entire structure of a first bag prior to inflation and deployment seen from a second base fabric.

FIG. 5 is a plan view showing the entire structure of the first bag 35 just before inflation and deployment (before it is folded to be stored) seen from the second base fabric.

Referring to FIG. 5, the first bag 35 is formed as a single bag by sewing a first base fabric 35A and a second base fabric 35B each having substantially the same shape over the entire circumference except the gas inlet 35a and the discharge passages 35t. A reference numeral 40 in the drawing represents the sewn joint portion, and a reference numeral 41 represents a seal member formed of an appropriate seal material along the sewn joint portion 40 so as to be sealed.

The second base fabric 35B includes the pressure deployment portion 37 with substantially a trapezoidal shape which expands from the side of the gas inlet 35a (lower side in the drawing) to the opposite side (upper side in the drawing), and a pair of the support deployment portions 38 disposed at the upper left and right sides of the pressure deployment portion 37. The first base fabric 35A has substantially the same configuration as that of the second base fabric 35B. The thus formed first base fabric 35A and the second base fabric 35B are sewn together along the entire circumference except the gas inlet 35a and the two discharge passages 35t, thus forming the pressure deployment portion 37, the pair of support deployment portions 38 arranged at left and right sides of the pressure deployment portion 37, and the discharge passages 35*t*. As a result, the pressure deployment portion 37, the support deployment portions 38, and the discharge passages 35*t* are arranged to be enveloped by the sewn joint portion 40 and the seal member 41.

The pressure deployment portion 37 includes four pressure deployment chambers 37*a*, 37*b*, 37*c* and 37*d* defined by a sewn joint portion 40*a* provided to substantially follow the gas inflow direction at substantially the center, and sewn joint portions 40*b* and 40*c* at both sides (left and right sides shown in the drawing) of the sewn joint portion 40*a*. The structure allows gas supplied from the gas inlet 35*a* to be smoothly introduced toward downstream side (upper side in the drawing) of the pressure deployment portion 37.

Substantially triangular shaped deployment discharge portions 90, 90 are provided at the left and right sides of the first bag 35.

The above-structured first bag 35 is formed by sewing outer edges of the first base fabric 35A and the second base fabric 35B which are overlaid along the sewn joint portion 40 and the sewn joint portions 40*a*, 40*b*, 40*c* and the like of the pressure deployment portion 37. Then it is bent such that the support deployment portions 38 at both sides are positioned to hold the left and right sides of the head of the occupant 2 with respect to the first bag 35 as shown in FIG. 4 to promote deployment of the second bag 36 upon the inflation and deployment while maintaining the bent state. Then the deployment discharge portions 90, 90 at the left and right sides of the first bag 35 are sewn to be joined with discharged portions 91, 91 (see FIG. 6) at both sides of the upper deployment portion 39 of the second bag 36.

Figure 6:
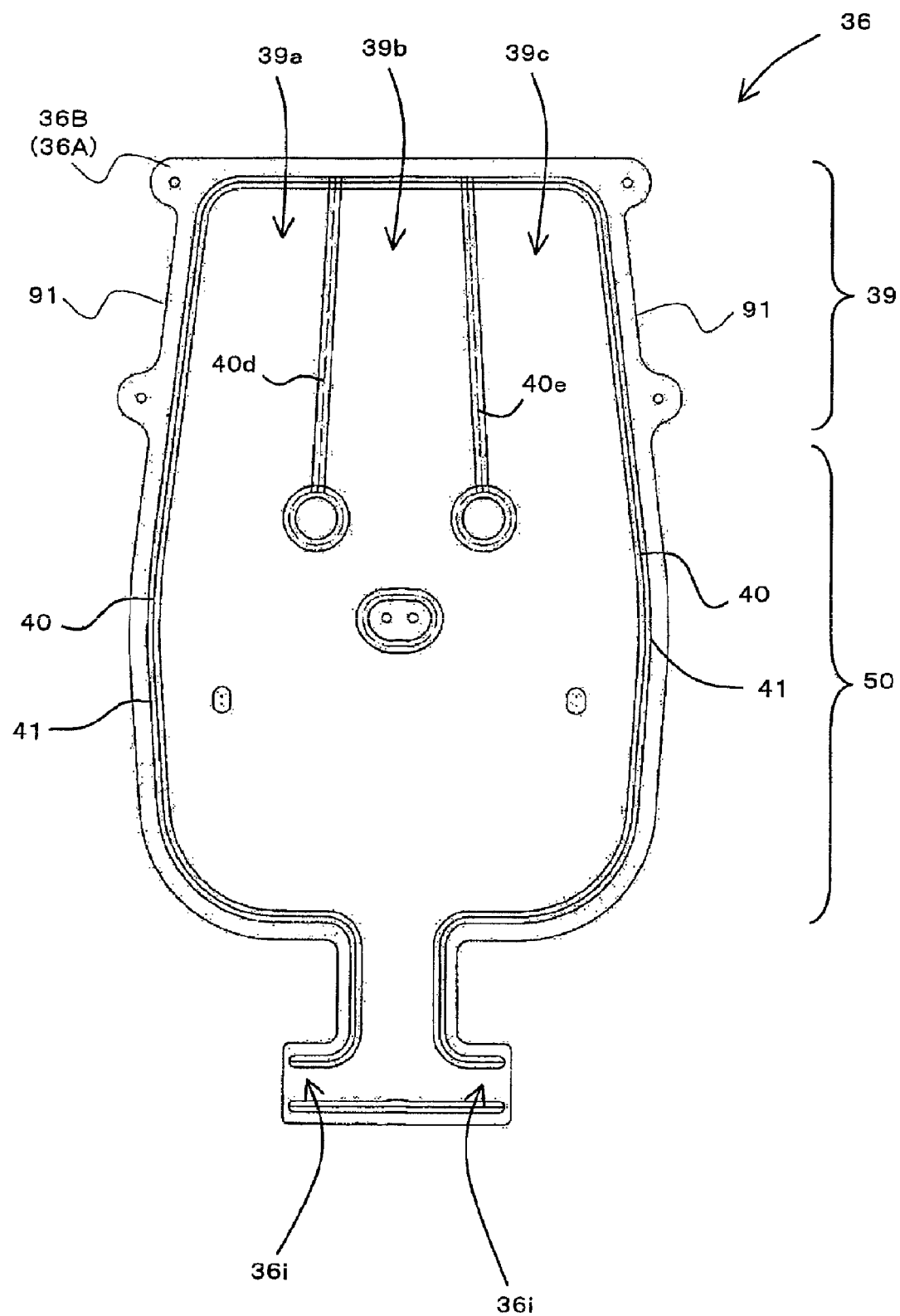
FIG. 6 is a plan view showing an entire structure of a second bag prior to inflation and deployment state seen from a fourth base fabric.

FIG. 6 is a plan view showing an entire structure of the second bag 36 before inflation and deployment (before it is folded to be stored) when seen from the side of the fourth base fabric 36B.

Referring to FIG. 6, the second bag 36 is formed as a single bag by sewing a third base fabric 36A and a fourth base fabric 36B each having substantially the same shape over the entire circumference except two intake passages 36*i*, and provided with the seal member 41.

The fourth base fabric 36B is substantially rectangular extending from the aforementioned intake passage 36*i* (lower side in the drawing) toward the opposite side (upper side in the drawing), and includes the upper deployment portion 39 at an upper side of the drawing and a lower deployment portion 50 at a lower side of the drawing. The third base fabric 36A has substantially the same shape as that of the fourth base fabric 36B. The thus shaped third base fabric 36A and the fourth base fabric 36B are sewn together along the entire circumference except the two intake passages 36*i* to form the upper deployment portion 39 as the upper half section, the lower deployment section as the lower half section, and the two intake passages 36*i* between the third base fabric 36A and the fourth base fabric 36B. As a result, the upper deployment portion 39, the lower deployment portion 50, and the intake passages 36*i* are arranged such that the outer edges thereof are enveloped by the sewn joint portion 40 and the seal member 41.

The upper deployment portion 39 and the upper section of the lower deployment portion 50 include three vertical deployment chambers 39*a*, 39*b* and 39*c* which are defined by two sewn joint portions 40*d*, 40*e* each disposed substantially along the gas inflow direction to divide the lateral section into three parts each having substantially the same area. This makes it possible to smoothly introduce gas from the intake passages 36*i* toward the downstream (upper side of the drawing) of the vertical deployment chambers 39*a*, 39*b* and 39*c*.

The above-structured second bag 36 is formed in the following manner. The outer edges of the third base fabric 36A and the fourth base fabric 36B overlaid are sewn along the sewn joint portion 40, and further along the sewn joint portions 40*d* and 40*e*. It is then bent forward such that the vertical deployment chambers 39*a*, 39*b* and 39*c* deploy upward of the head of the occupant 2 with respect to the first bag 35 as shown in FIG. 4. The discharged portions 91, 91 at both sides of the aforementioned upper deployment portion 39 are sewn to be joined with the deployment discharge portions 90, 90 of the support deployment portions 38 at both sides of the first bag 35.

The first bag 35 and the second bag 36 are overlapped at the pressure deployment portion 37 and the lower deployment portion 50. The three sewn joint portions 40*a*, 40*b* and 40*c* of the pressure deployment portion 37, and the two sewn joint portions 40*d* and 40*e* of the lower deployment portion 50 are formed to be displaced with one another on the overlapped area between the pressure deployment portion 37 and the lower deployment portion 50. Accordingly, four pressure deployment chambers 37*a*, 37*b*, 37*c* and 37*d* and the vertical deployment chambers 39*a*, 39*b* and 39*c* deploy at displaced positions with one another.

The gas inlet 35*a* formed in the center of the lower portion of the first bag 35 serves to supply the pressure fluid upward in the drawing. The discharge passages 35*t* are formed at positions each apart from the line extending from the gas inlet 35*a* in the inflow direction of the pressure fluid.

Figure 7:
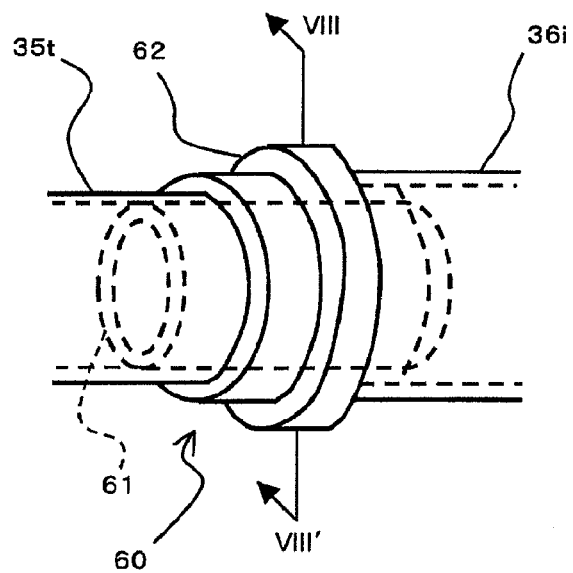
FIG. 7 is a perspective view as a sight through which an enlarged joint portion between one of discharge and intake passages in FIG. 4 is shown.
Figure 8:
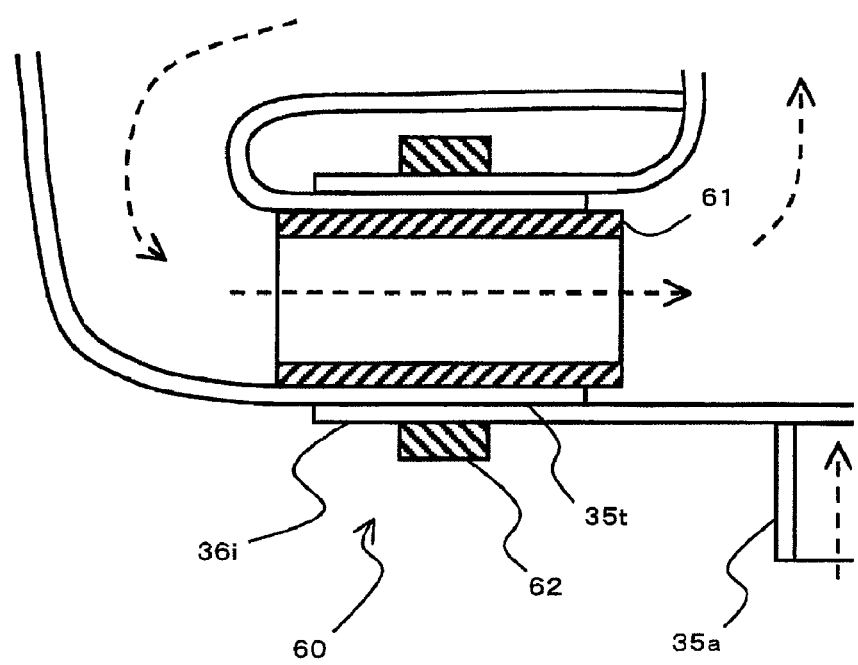
FIG. 8 is a sectional view taken along line VIII-VIII' shown in FIG. 7.

FIG. 7 is a partially perspective view of an enlarged joint portion between the discharge passage 35*t* and the intake passage 36*i* at one side shown in FIG. 4. FIG. 8 is a sectional view taken along line VIII-VIII' shown in FIG. 7.

Referring to FIGS. 7 and 8, the discharge passage 35*t* of the first bag 35 is inserted into the intake passage 36*i* of the second bag 36, and the resultant overlapped portions are joined with the passage joint member 60. The passage joint member 60 includes a hollow communication pipe 61 inserted into the overlapped portion between the discharge passage 35*t* and the intake passage 36*i*, and an outer tightening member 62 attached to the overlapped portion to apply the tightening force from the outer circumference of the intake passage 36*i*.

The hollow communication pipe 61 formed of a relatively rigid plastic is configured as a round tube (pipe) with an inner diameter sufficient to allow the pressure fluid to smoothly flow therethrough. The outer tightening member 62 is structured to tighten the overlapped portions of the discharge passage 35*t* and the intake passage 36*i* from the outer circumference so as to be secured to the hollow communication pipe 61 while maintaining the high sealing capability using a tie lap or the clamp band, for example.

The thus joined first bag 35 and the second bag 36 form the single airbag 11, which is folded to be stored in the retainer 12. The shape of the hollow communication pipe 61 formed of the rigid material is not deformed by the folded airbag 11. In other words, the cross section shape of the passage and the communication state at the overlapped portions between the discharge passage 35*t* and the intake passage 36*i* may be maintained.

The airbag device 10 according to the embodiment provides the following effects.

The airbag system 10 according to the example includes the passage joint member 60 structured to join the discharge passage 35*t* of the first bag 35 with the intake passage 36*i* of the second bag 36 while maintaining each cross section shape of the passages. When the pressure fluid is supplied from the inflator 13 to inflate and deploy the airbag 11, the joint portion between the discharge passage 35*t* and the intake passage 36*i* for communicating insides of two chambers of the first bag 35 and the second bag 36 is not affected under the pressure resulting from inflation of the bag, thus allowing the passage joint member 60 to maintain the cross section shape of the passage. As a result, the pressure fluid is allowed to smoothly flow from the first bag 35 to the second bag 36, thus improving the entire deployment performance of the airbag 11. When the joint portion is joined through sewing, the pressure loss in the pressure fluid may occur from the sewn portion. However, the use of the passage joint member 60 may suppress the aforementioned disadvantages such as the pressure loss, thus improving the deployment performance of the entire airbag 11.

In the embodiment, the joint portion between the discharge passage 35*t* and the intake passage 36*i* for communicating insides of the two chambers of the first bag 35 and the second bag 36 (in other words, the position of the passage joint member 60) is set so as not to interfere with each inflation and deployment of the first bag 35 and the second bag 36 (in the example, it is arranged at the inflator supply side outside the inflation range of the pressure deployment portion 37 of the first bag 35 and the lower deployment portion 50 of the second bag 36 as the inflation portions so as not to cause bending and the like). The joint portion itself is unlikely to be pushed under the influence of the inflation of the bag upon the inflation and deployment. This may suppress reduction in the cross section shape of the passage, thus improving the deployment performance of the entire airbag by allowing the pressure fluid to smoothly flow from the first bag to the second bag.

In the example, the passage joint member 60 includes the hollow communication pipe 61 inserted into the discharge passage 35*t* and the intake passage 36*i*, and the outer tightening member 62 for tightening the discharge passage 35*t* and the intake passage 36*i* from the outer circumference so as to be secured to the hollow communication pipe 61. This makes it possible to maintain the cross section shape of the passage at each inner circumference of the discharge passage 35*t* and the intake passage 36*i* without being crushed by the folded airbag 11, thus allowing the outer tightening member 62 to secure those passages with high sealing capability.

In the example, the discharge passage 35*t* is inserted into the inner circumference of the intake passage 36*i*, and the hollow communication pipe 61 is further inserted into the inner circumference of the discharge passage 35*t*. In the case where the pressure fluid is discharged from the discharge passage 35*t* at the high pressure, the whole pressure fluid is allowed to flow to the inside of the second bag 36 from the discharge passage 35*t* without causing leakage to the outside.

In the example, the first bag 35 includes the pressure deployment portion 37 which is inflated and deployed by the pressure fluid supplied from the inflator 13, and the second bag 36 includes the upper deployment portion 39 which is inflated and deployed upward of the head of the occupant 2 by the pressure fluid supplied from the inflator 13. When the pressure fluid is supplied from the inflator 13 to the airbag 11, the pressure deployment portion 37 of the first bag 35 inflates (the function for promoting deployment of the deployment discharge portion 90 to be described later is added). Then the upper deployment portion 39 of the second bag 36 inflates to deploy upward of the head of the occupant 2 to restrain the upward movement of the head of the occupant 2.

In the embodiment, the pressure deployment portion 37 of the first bag 35 inflates and deploys at the side opposite the back of the head of the occupant 2. The second bag 36 includes the lower deployment portion 50 which inflates and deploys at the side opposite the occupant 2, and is disposed to be overlapped with the pressure deployment portion 37. The total of the respective thickness values of the pressure deployment portion 37 and the lower deployment portion 50 may change the position to be further effectively bent forward with respect to the back of the head of the occupant 2. The pressure fluid is directly supplied to the first bag 35 from the inflator 13 first to start inflating and deploying, and subsequently, the pressure fluid is introduced into the second bag 36 to allow the upper deployment portion 39 to start inflating and deploying upward of the head of the occupant 2. As a result, the entire airbag 11 may be smoothly inflated and deployed without forcedly bending or breaking the upper deployment portion 39.

Figure 9:
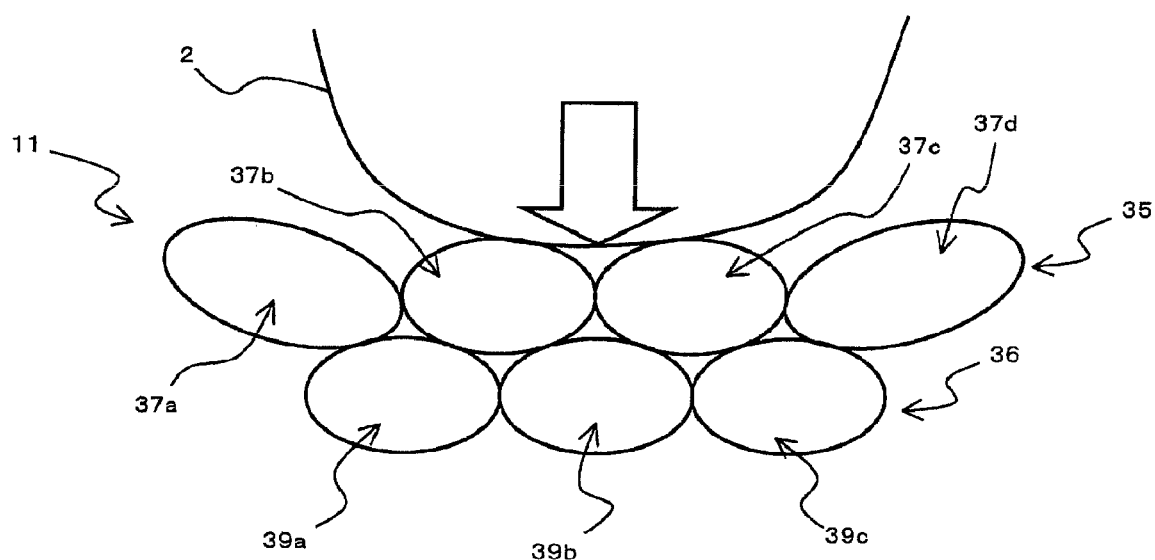
FIG. 9 is a sectional view taken along line IX-IX' shown in FIG. 4.

In the example, the sewn joint portion formed in the pressure deployment portion 37 is not aligned with respect to the sewn joint portion formed in the lower deployment portion 50. FIG. 9 is a sectional view taken along line IX-IX' shown in FIG. 4. Referring to the drawing, upon inflation and deployment of the pressure deployment portion 37 and the lower deployment portion 50, each thin portion on the sewn joint portions 40*a*, 40*b*, 40*c*, 40*d* and 40*e* formed with respect to the respective thicknesses is not aligned with each thick portion among the sewn joint portions 40*a*, 40*b*, 40*c*, 40*d* and 40*e* between the pressure deployment section 37 and the lower deployment section 50. When the pressure deployment portion 37 and the lower deployment portion 50 are overlapped to press the back of the head of the occupant 2, the head of the occupant 2 may be naturally pressed without making the respective thin portions or thick portions overlapped, that is, causing a large bias in the entire thickness of the airbag 11.

In the example, the discharge passage 35*t* of the first bag 35 is positioned apart from the line extended from the gas inlet 35*a* in the inflow direction of the pressure fluid. In the structure, the pressure fluid is not directly introduced from the gas inlet 35*a* to the discharge passage 35*t* inside the first bag 35, but is bypassed by taking a long time. This makes it possible to generate the time lag in inflation and deployment between the first bag 35 and the second bag 36. As a result, the order for inflating and deploying the aforementioned two chambers may be definitely determined, thus enabling the entire airbag 11 to be smoothly inflated and deployed.

In the example, the joint portion between the discharge passage 35*t* and the intake passage 36*i* for communicating insides of the two chambers of the first bag 35 and the second bag 36 is positioned so as not to interfere with the inflation and deployment of the first bag 35 and the second bag 36. Moreover, the joint portion is joined with the passage joint member 60. However, the use of one of the aforementioned two features is sufficient for obtaining the effect of improving the deployment performance by maintaining the cross section shape of the passage and allowing the pressure fluid to smoothly flow.

The joint portion between the discharge passage 35*t* and the intake passage 36*i* may be formed into the passage with substantially a tubular shape by performing the ordinary sewing of the basic fabrics instead of using the rigid member like the passage joint member 60. Unlike the case where the passage formed by sewing the base fabrics is formed in the inflation and deployment direction of the first bag 35 and the second bag 36 (the path on which each base fabric of the bag passes upon inflation and deployment to change the shape from the storage state), the aforementioned structure is unlikely to be pressed under the influence of the inflation of the bag. This makes it possible to suppress reduction in the cross section shape of the passage, and to improve the deployment performance of the entire airbag by allowing the pressure fluid to smoothly flow from the first bag to the second bag.

Alternatively, the joint portion between the discharge passage 35t and the intake passage 36i may be joined by the passage joint member 60 so as to be positioned in the direction where the first bag 35 and the second bag 36 inflate and deploy (the path on which the base fabric passes when they change the shapes from the storage state to inflate and deploy). The structure makes it possible to maintain the cross section shape of the passage without being pressed by the inflation of the bag unlike the case where the joint portion between the discharge passage 35t and the intake passage 36i is formed of the substantially tubular shape by sewing the ordinary base fabrics. As a result, the pressure fluid is allowed to smoothly flow from the first bag to the second bag, providing the effect for improving the deployment performance of the entire airbag.

The above-described examples are not limited to the present invention, but may be changed into various forms without departing from the spirit of the present invention.

The invention claimed is:

1. An airbag comprising
   a first bag formed as a bag by joining first base fabrics, which includes a supply passage for supplying a pressure fluid fed from an inflator inward, and a discharge passage for discharging the pressure fluid supplied inward to an outside; and
   a second bag formed as a bag by joining second base fabrics, which includes an intake passage for introducing the pressure fluid discharged from the discharge passage of the first bag inward, wherein the discharge passage of the first bag and the intake passage of the second bag are joined while maintaining each cross section shape of the discharge passage and the intake passage,
   wherein the passage joint member includes a hollow communication pipe inserted into the discharge passage and the intake passage, and an outer tightening member for tightening the discharge passage and the intake passage from an outer circumference to be secured to the hollow communication pipe, and the discharge passage is joined at a position to be inserted between an outer circumference of the hollow communication pipe and an inner circumference of the intake passage.

2. An airbag device comprising:
   the airbag according to claim 1; and
   an inflator for supplying a pressure fluid for inflating and deploying the airbag.

3. The airbag according to claim 1, wherein:
   the first bag includes a pressure deployment portion which inflates and deploys by the pressure fluid fed from the inflator, and the pressure deployment portion includes a deployment discharge portion for discharging the second bag upward; and
   the second bag includes an upper deployment portion which is inflated and deployed by the pressure fluid fed from the inflator.

4. The airbag according to claim 3, wherein the discharge passage of the first bag is positioned apart from a line extending in an inflow direction of the pressure fluid from the supply passage.

5. The airbag according to claim 3, wherein:
   the second bag includes a lower deployment portion which is positioned to inflate and deploy so as to be overlapped with the pressure deployment portion.

6. The airbag according to claim 5, wherein a sewn joint portion formed in the pressure deployment portion and a sewn joint portion formed in the lower deployment portion are formed not to be aligned with each other.

* * * * *